US006933955B2

(12) United States Patent
Crocitti et al.

(10) Patent No.: US 6,933,955 B2
(45) Date of Patent: Aug. 23, 2005

(54) PROCESS AND DEVICE FOR REPRESENTATIONS OF APPLICATION ON A DIGITAL TELEVISION SCREEN

(75) Inventors: Valérie Crocitti, Saint Armel (FR); Pierre Houeix, Cesson-Sévigné (FR); Caroline Landry, Cesson-Sévigné (FR)

(73) Assignee: Thomson Licensing S.A., Boulogne Cedex (FR)

( * ) Notice: Subject to any disclaimer, the term of this patent is extended or adjusted under 35 U.S.C. 154(b) by 500 days.

(21) Appl. No.: 09/739,147

(22) Filed: Dec. 18, 2000

(65) Prior Publication Data

US 2001/0022628 A1 Sep. 20, 2001

(30) Foreign Application Priority Data

Dec. 30, 1999 (FR) ............................................. 99 16745

(51) Int. Cl.[7] ................................................. G09G 5/00
(52) U.S. Cl. ......................... 345/666; 345/667; 345/788
(58) Field of Search ................................ 348/563, 564, 348/565, 566, 567, 568, 580, 581, 747; 725/40, 61; 345/667, 154, 157, 660, 666, 788, 800, 801, 418, 473, 668, 669

(56) References Cited

U.S. PATENT DOCUMENTS

| 5,555,354 | A | * | 9/1996 | Strasnick et al. ........... 345/427 |
| 5,583,560 | A | * | 12/1996 | Florin et al. .................. 725/40 |
| 5,596,346 | A | * | 1/1997 | Leone et al. ................ 345/667 |
| 5,657,091 | A |   | 8/1997 | Bertram |
| 5,671,019 | A | * | 9/1997 | Isoe et al. .................... 348/565 |
| 5,844,620 | A | * | 12/1998 | Coleman et al. .............. 725/54 |
| 5,940,073 | A |   | 8/1999 | Klosterman et al. |
| 6,133,914 | A | * | 10/2000 | Rogers et al. .............. 345/661 |
| 6,184,859 | B1 | * | 2/2001 | Kojima ........................ 345/629 |
| 6,229,573 | B1 | * | 5/2001 | Sato et al. ................... 348/516 |
| 6,396,507 | B1 | * | 5/2002 | Kaizuka et al. ............. 345/661 |
| 6,473,080 | B1 | * | 10/2002 | Brown et al. ............... 345/419 |
| 6,473,102 | B1 | * | 10/2002 | Rodden et al. ............. 345/788 |
| 6,526,577 | B1 | * | 2/2003 | Knudson et al. .............. 725/40 |

FOREIGN PATENT DOCUMENTS

EP 0912059 A2 4/1999 ............ H04N/7/16

OTHER PUBLICATIONS

Eric Weinstein's World of Mathematics http://mathworld.wolfram.com/Homothetic.html.*
French Search Report.

* cited by examiner

Primary Examiner—Mark Zimmerman
Assistant Examiner—Enrique L Santiago

(57) ABSTRACT

The present invention relates to a process and device for representation on a digital television screen.

The process for the representation on a digital television screen of a display comprising the representation of a video signal, the representation of applications and the representation of the navigator is characterized in that it comprises
  a step of detecting the activation of the navigator,
  a step of resizing the display of the video signal and the representation of applications according to one and the same homothetic reduction.

7 Claims, 3 Drawing Sheets

PROCESS AND DEVICE FOR REPRESENTATIONS OF APPLICATION ON A DIGITAL TELEVISION SCREEN

FIELD OF THE INVENTION

The invention relates to a process and to its device, for dimensioning and positioning on-screen representations of digital video signals, representations of services provided by applications, and representations of a navigator on a screen, for example a digital television screen.

BACKGROUND

The technology which enables the user to gain access to interactive services is known in the prior art, in the realm of digital television. These services are either provided by the digital television manufacturer, or by outside companies. The services may be built into the television set or may be transferred from outside, to the television, by means of an application and then subsequently executed. Several services may be used at the same time. An application is a particular use of information technology which makes it possible in particular to offer a service. An application manager is in charge of managing all these services. There is a particular application, referred to as the navigator, commonly provided by the digital television manufacturer which enables the user to drive the various applications and hence to navigate around the services. The navigator and the application manager exhibit tight links. The navigator is commonly activated by means of a remote control furnished with a means of selection. The navigator makes it possible in particular to gain access to the various services such as those for choosing favorite interactions, favorite stations or outside services communicated for example by satellite or by cable, etc.

At present the display screen is shared between the various interactive services and the navigator. When it is activated, the navigator appears on the screen, masking a certain part of the graphics area. The representations of the applications are defined in the applications data, these representations may be located in the part masked by the navigator and may no longer appear. The navigator may also mask a part of the representation of the video signal. One solution may be to reduce the size of the video display. However, in this case the position and the size of the representation of the applications are no longer complied with relative to that of the representation of the video signal. The representation of the applications may moreover be masked.

To remove the risk of having the representation of applications which are poorly placed or poorly dimensioned, the following solutions exist at present:

The navigator covers the whole of the screen, but in this case the user can no longer view on screen the representation of the applications.

When the size and the position of the video signal are modified, a cue comes to the applications to resize the size and the position of their on-screen representation. This assumes the provision of an interface for programming complex applications. This interface must be compatible with the services developed. This solution has flaws. Firstly that of being limited to services which are compatible with the interface for programming applications, next that of making errors in programming. Moreover, certain applications present difficulties in being resized and therefore require additional programming as well as a memory of larger size.

A first object of the invention is to provide a process for a display screen allowing the sharing of the screen area between the representations of the various services and of the navigator and such that the proportions and the positioning of the on-screen representations of the applications relative to the on-screen representation of the video signal are preserved.

A second object of the invention is to provide a device for a display screen such that the representation of the navigator does not mask either the representation of the applications or that of the video signal.

According to the invention, if the area of the screen for viewing the video signal is reduced by the screen area required for displaying the navigator, the representation of the applications is automatically resized and repositioned as a function of the new area available for the representation on the screen for viewing the video signal and the applications. The user therefore observes a homothetic reduction on the screen of the depiction of the video signal and of the representation of the applications relative to the space occupied on the screen with the video signal in a situation of maximum area of representation. If the user exits the navigator, then the on-screen depiction will represent on the entire area of the screen the representation of the video signal as well as the representation of the applications.

SUMMARY OF THE INVENTION

The subject of the invention is a process for the representation on a digital television screen of a display comprising the representation of a video signal, the representation of applications, the representation of the navigator wherein it comprises a step of detecting the activation of the navigator and a step of resizing the display of the video signal and the representation of the applications according to one and the same homothetic reduction.

The representation process is also characterized in that the area occupied by the display of the representation of the navigator covers the area left vacant by the homothetic reduction.

The process or the representation on a digital screen of a display comprising the representation of a video signal, the representation of applications and the representation of a navigator can also be characterized in that it comprises a step of detecting the deactivation of the navigator and a step of resizing the display of the video signal and the representation of the applications according to one and the same homothetic increase. The process is characterized in that the representation of the video signal and the representation of the applications then occupy the entire digital television screen.

The object of the invention is also a device for the representation on a digital television screen of a video signal, of applications, of a navigator wherein it comprises a control module comprising at least means for detecting the activation of the navigator, a repositioner reformatter, a mixer for mixing the representations of the applications and/or of the video signal with that of the navigator, means in the control module for detecting a modification of the state of activation of the navigator and for ordering the repositioner reformatter to resize and reposition the representation of the applications and/or of the display of the video signal, means for mixing the representations of the applications and/or of the video signal with that of the navigator.

The invention also relates to a device for the representation on a digital television screen of a video signal, and of applications, wherein a repositioner reformatter circuit is associated with each representation of the applications and with the display of the video signal.

BRIEF DESCRIPTION OF THE DRAWINGS

Other features and advantages of the present invention will become more clearly apparent from reading the following description given with reference to the appended drawings in which.

DETAILED DESCRIPTION

Figure 1:
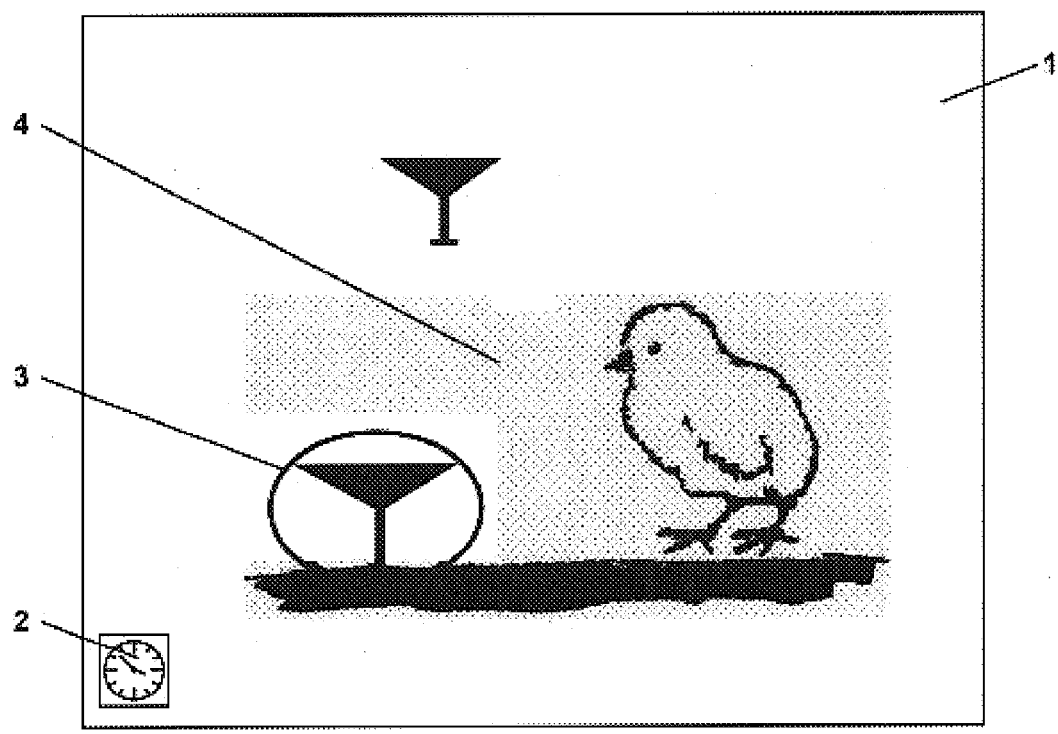
FIG. 1 represents the display screen when it is dedicated to the video signal and to the graphical representation of the applications.

FIG. 1 represents the display screen (1) when it is dedicated to the display of a video signal and to the graphical representation of applications. The screen displays the representation of a clock (2) which constitutes a display application. A second graphical application consists of a thick circle (3) surrounding the representation of a glass. Finally, also appearing on the screen is the representation (4) of a video signal portrayed as a captioned drawing of a chick and a second glass.

Figure 2:
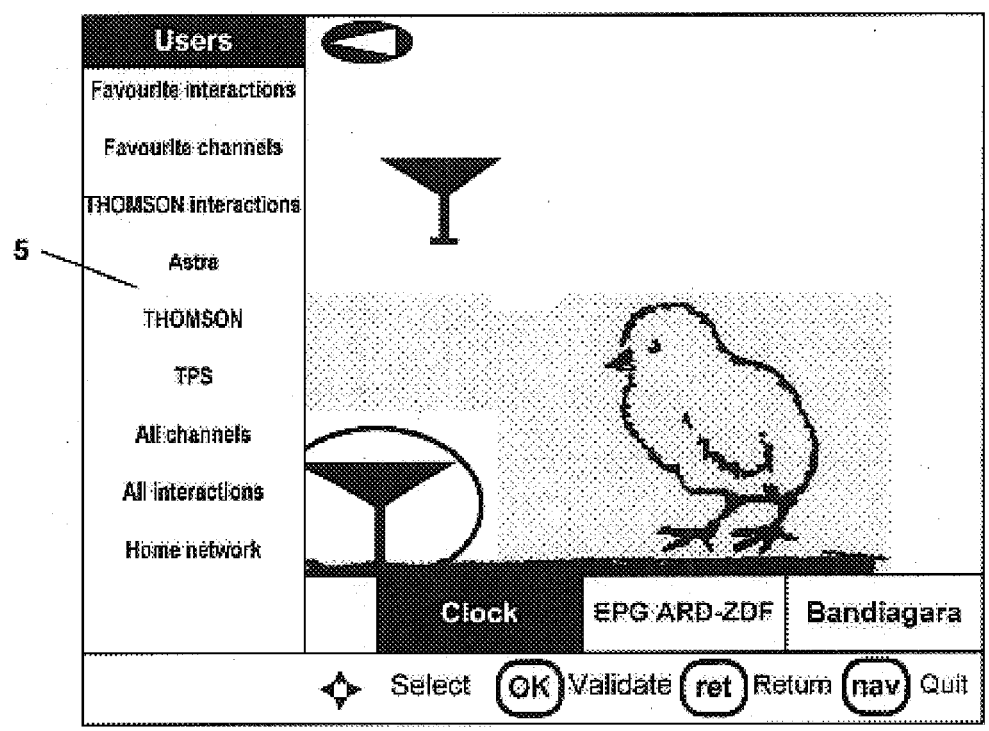
FIG. 2 represents the display screen when the navigator is activated without the area for representing the video signal being resized.

FIG. 2 represents the display screen (1) when the navigator is activated and displayed on a part of the area for representation of the video signal without resizing this representation. The representation 5 of the navigator appears on the left and lower borders of the screen. In this case, the thick circle (3) is partly concealed and the clock is completely masked.

Figure 3:
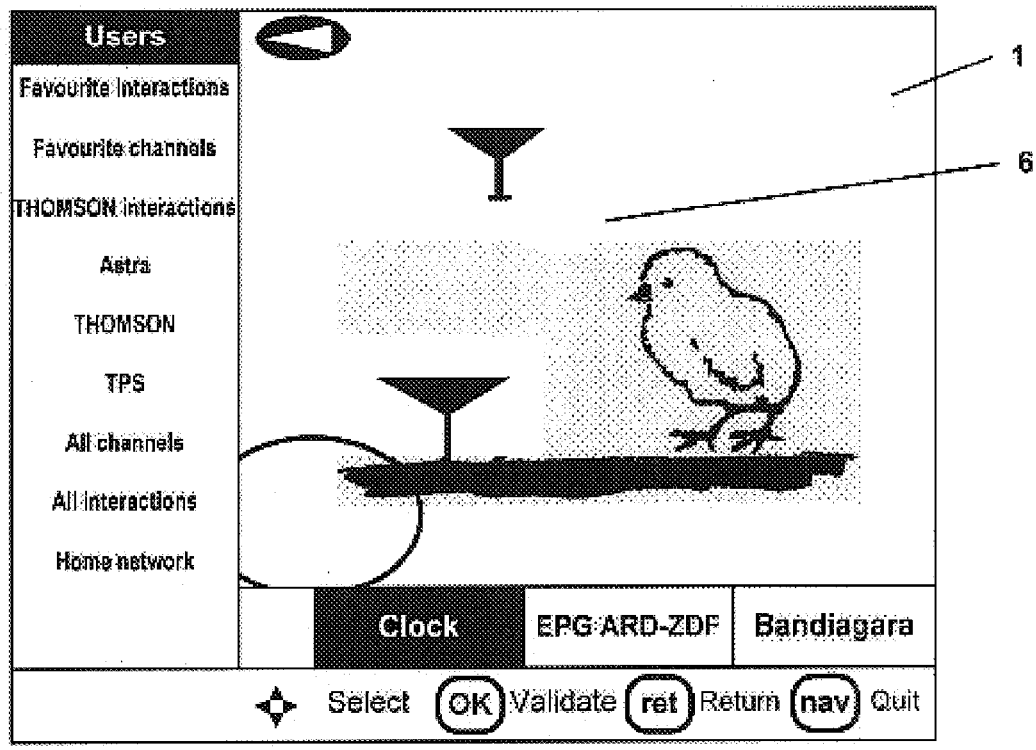
FIG. 3 represents the display screen when the navigator is activated, the area for representing the video signal being resized without the graphical representation of the applications being resized or repositioned.

FIG. 3 represents the display screen (1) when the navigator is activated, the representation of the video signal (6) is resized, the graphical representation of the applications is neither resized nor repositioned. In this example, the clock is no longer visible, it is masked by the representation of the navigator, the circle no longer surrounds the glass, the size of the circle has not varied although the size of the glass has been reduced. There is no longer any causal link between the object in the image and the link for calling up the application corresponding to this object.

Figure 4:
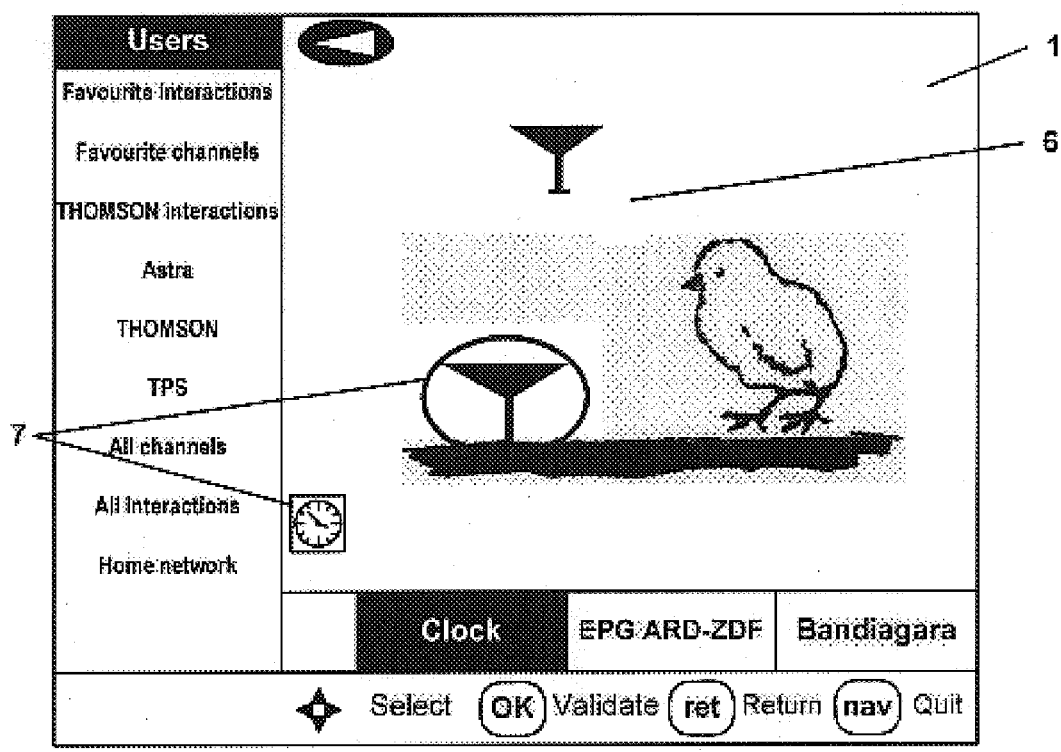
FIG. 4 represents the display screen when the navigator is activated, the area for representing the video signal being resized, the on-screen representation of the applications is also resized and repositioned.

FIG. 4 represents the display screen (1) with the navigator activated, the area for representing the video signal (6) resized, and when the on-screen representation of the applications (7) (clock and graphical circle) is resized and repositioned.

Figure 5:
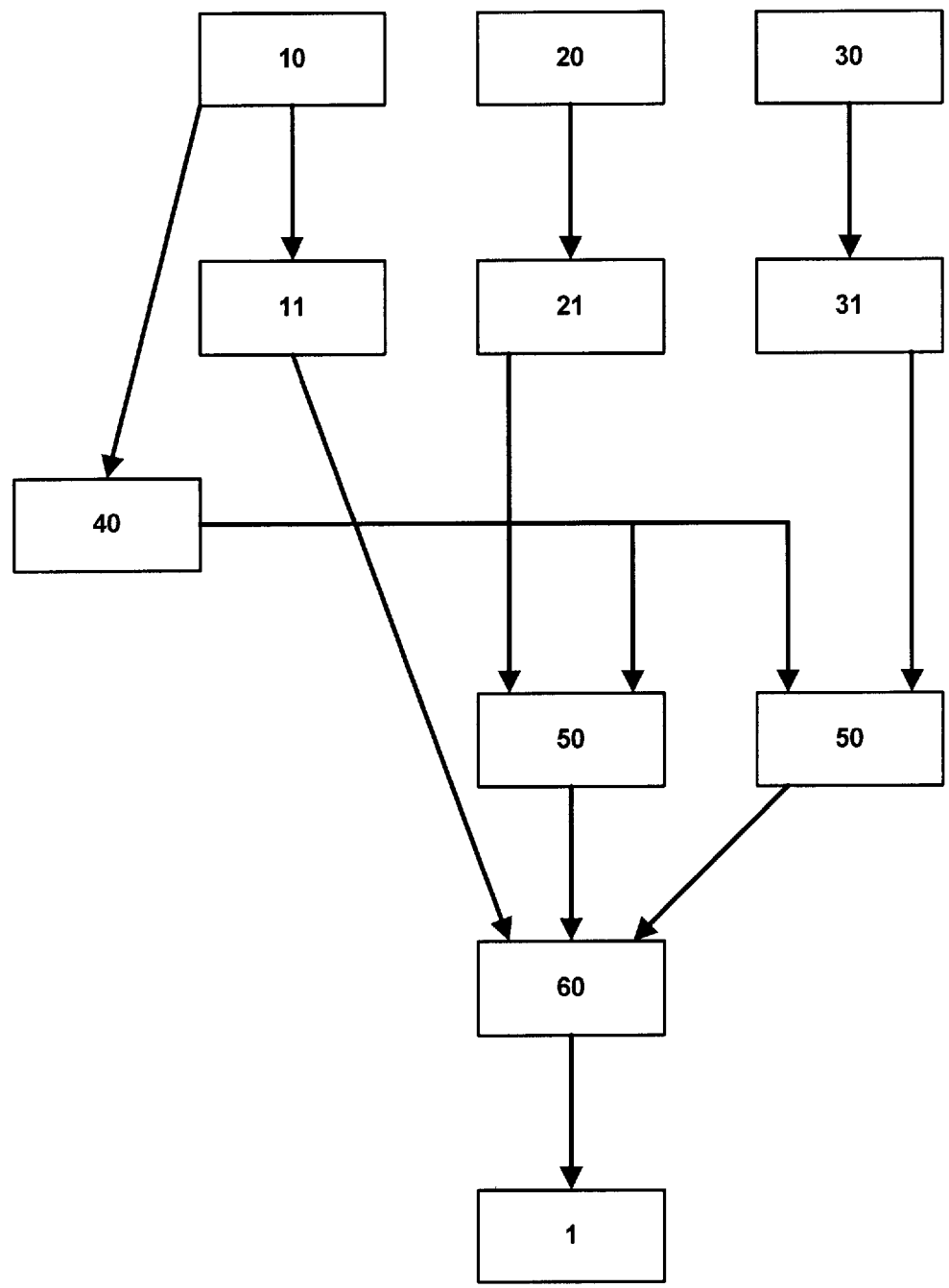
FIG. 5 represents a functional graphic of the method for repositioning and resizing the on-screen representations.

FIG. 5 represents a functional graphic representing implementational means for representing graphics on screen. The navigator (10) generates the display signals (11) required for its representation, the applications (20) are represented by the display signals (21) allowing their representation, such as represented in FIG. 1. The display signals (11 and 21) are arrays comprising the characteristics making it possible to define the set of points of the respective applications. The video decoder (30) emits a signal (31) which makes it possible to construct the representation of the video signal. When the navigator is activated, it sends an order to the control module (40). This control module (40) triggers the operation of the module (50) referred to as the repositioner reformatter embodied in the form of a resampler. The function of the repositioner reformatter is to reposition and modify the dimensions of the graphics (position along the XY axes, length L and width l of the representation according to a technique well known from the prior art. When the navigator (10) is activated, it orders the control module (40) to pass the order to the repositioner reformatter (50) to reposition the coordinates and to resize the format, in terms of width and length, of the representation of the video signal and of the representation of the applications. A mixer circuit (60) mixes together the representations of the video signal with that of the applications and with that of the navigator. The signal thus constructed is then displayed on the digital television screen (1) so as to constitute the representation of FIG. 4.

Conversely, when the navigator (10) is deactivated, the control module (40) detects this new state and addresses the instruction to the repositioner reformatter (50) to reposition and to resize the display (31) of the video signal and the representation (21) of the applications. The mixer (60) mixes together the display of the video signal (31) and the representation of the applications (21). The whole is then displayed on the digital television screen (1). The video display (31) and the representation of the applications (21) are then subjected to the same homothetic increase of their representation. In a particular case the display of the video signal (31) can occupy the entire digital television screen (1).

Other modifications within the scope of the person skilled in the art will also form part of the spirit of the invention.

What is claimed is:

1. Process for generating for display on a display device a representation of a video signal, at least one representation of an application, and a representation of a navigator, the process comprising the steps of:

generating a graphics area displaying the representation of the video signal, the at least one representation of an application, and the representation of the navigator;

detecting an activation of the navigator, resizing the representation of the video signal and the at least one representation of an applications according to a homothetic reduction, in a first mode of operation, and resizing by reducing the representation of the video signal, in a second mode of operation, wherein the area occupied by the at least one representation of an application is the same during said resizing step.

2. A process according to claim 1, wherein the representation of the navigator occupies the area left vacant by the homothetic reduction of the representation of the video signal and the at least one representation of an application in the first mode of operation and the representation of the navigator occupies the area left vacant by the resized representation of the representation of the video signal in the second mode of operation.

3. Process for generating for a display device a representation of a video signal, at least one representation of an applications, and a representation of a navigator, the process comprising the steps of:

detecting a deactivation of the navigator, resizing the representation of the video signal and the at least one representation of an application according to a homothetic increase, in a first mode of operation, and resizing by expanding the representation of the video signal, in a second mode of operation, wherein the area occupied by the at least one representation of an application is the same during said resizing step.

4. Process according to claim 3, wherein the representation of the video signal and the at least one representation of the applications occupy the entire graphics area.

5. A device for generating for display a representation of a video signal, at least one representation of an application, and a representation of a navigator comprising:

a control module comprising
 a means for detecting the activation of the navigator,
 a means for detecting a modification in a state of activation of the navigator
a repositioning reformatter for resizing the representation of the video signal and the at least one representation of an application that operates in view of the means for detecting a modification in the state of activation of the navigator by resizing the representation of the video signal and the at least one representation of an application in a first mode of operation and resizing the representation of the video signal leaving unaffected the at least one representation of an application in a second mode of operation a mixer for mixing the representation of the video signal and the representation of the at least one representation of an application, and the representation of the navigator.

6. A device according to claim 5, wherein the repositioner reformatter circuit is associated with at least one representation of an application.

7. A device according to claim 5, wherein said device is a display device.

* * * * *